United States Patent
Pfister et al.

(10) Patent No.: US 12,109,699 B2
(45) Date of Patent: Oct. 8, 2024

(54) METHOD FOR CONTROLLING AT LEAST ONE SERVOMOTOR, ASSOCIATED CONTROL DEVICE, ROBOT AND COMPUTER PROGRAM PRODUCT

(71) Applicant: KUKA Deutschland GmbH, Augsburg (DE)

(72) Inventors: Thomas Pfister, Untermeitingen (DE); Michael Langhans, Ehekirchen (DE); Andreas Fischer, Augsburg (DE)

(73) Assignee: KUKA Deutschland GmbH (DE)

( * ) Notice: Subject to any disclaimer, the term of this patent is extended or adjusted under 35 U.S.C. 154(b) by 148 days.

(21) Appl. No.: 17/795,458

(22) PCT Filed: Jan. 13, 2021

(86) PCT No.: PCT/EP2021/050549
§ 371 (c)(1),
(2) Date: Jul. 26, 2022

(87) PCT Pub. No.: WO2021/151667
PCT Pub. Date: Aug. 5, 2021

(65) Prior Publication Data
US 2023/0087833 A1    Mar. 23, 2023

(30) Foreign Application Priority Data

Jan. 27, 2020   (DE) ..................... 10 2020 200 925.2

(51) Int. Cl.
*B60L 3/04*   (2006.01)
*B25J 9/00*   (2006.01)
(Continued)

(52) U.S. Cl.
CPC ............. *B25J 9/126* (2013.01); *B25J 9/0048* (2013.01); *B25J 9/1615* (2013.01);
(Continued)

(58) Field of Classification Search
CPC ........ B25J 9/126; B25J 9/0048; B25J 9/1615; G05B 2219/40269; B60L 3/04; B60L 53/24
See application file for complete search history.

(56) References Cited

U.S. PATENT DOCUMENTS 8,736,219 B2    5/2014   Hofmann et al.
2009/0224706 A1   9/2009   Jobard
(Continued)

FOREIGN PATENT DOCUMENTS

DE   10 2007 059 492 B4   6/2018
EP       1818207 A2       8/2007
(Continued)

OTHER PUBLICATIONS

European Patent Office; Search Report in related International Patent Application No. PCT/EP2021/050549 dated Apr. 7, 2021; 2 pages.

*Primary Examiner* — Cortez M Cook
(74) *Attorney, Agent, or Firm* — Dorton & Willis, LLP

(57) ABSTRACT

A method for controlling a servomotor with a converter includes monitoring a circuit of a direct-voltage DC link that is connected to an input circuit for flow of an electric current; switching off a first switching device to end the supply of the direct-voltage DC link from an electrical grid if a stop signal occurs; braking the servomotor by control of power semiconductor switches of an inverter circuit in a regenerative braking operation, to reduce the rotation speed of the servomotor, if the monitoring detects that an electric current is not flowing after the first switching device has been switched off; and switching off a second switching device to prevent feeding electrical energy from the direct-voltage DC link into the servomotor if the monitoring
(Continued)

detects a flow of electric current after the first switching device has been switched off.

11 Claims, 5 Drawing Sheets

(51) Int. Cl.
*B25J 9/12* (2006.01)
*B25J 9/16* (2006.01)
*G05B 19/4155* (2006.01)

(52) U.S. Cl.
CPC .................. *G05B 19/4155* (2013.01); *G05B 2219/34013* (2013.01); *G05B 2219/40269* (2013.01)

(56) References Cited

U.S. PATENT DOCUMENTS

| | | | | |
|---|---|---|---|---|
| 2010/0079093 | A1* | 4/2010 | Kitanaka | B60L 3/04 318/400.3 |
| 2013/0234675 | A1* | 9/2013 | King | B60L 53/24 320/163 |
| 2018/0267104 | A1* | 9/2018 | Yang | H02M 1/08 |
| 2020/0313597 | A1* | 10/2020 | Yoshida | B66D 1/12 |

FOREIGN PATENT DOCUMENTS

| | | |
|---|---|---|
| EP | 2 224 586 A1 | 9/2010 |
| JP | 2014065086 A | 4/2014 |

* cited by examiner

METHOD FOR CONTROLLING AT LEAST ONE SERVOMOTOR, ASSOCIATED CONTROL DEVICE, ROBOT AND COMPUTER PROGRAM PRODUCT

CROSS-REFERENCE TO RELATED APPLICATIONS

This application is a national phase application under 35 U.S.C. § 371 of International Patent Application No. PCT/EP2021/050549, filed Jan. 13, 2021 (pending), which claims the benefit of priority to German Patent Application No. DE 10 2020 200 925.2, filed Jan. 27, 2020, the disclosures of which are incorporated by reference herein in their entirety.

TECHNICAL FIELD

The invention relates to a method for controlling at least one servomotor by means of a converter. The invention moreover relates to an associated control device, a robot, and a computer program product.

BACKGROUND

EP 2 224 586 A1 discloses a method for controlling a motor-driven industrial robot, which comprises at least one drive motor fed by a supply circuit connectable to mains voltage, which supply circuit comprises at least one rectifier circuit connectable to the mains voltage, an intermediate circuit with at least one intermediate circuit capacitor, and a bridge switch device connected to the drive motor on the output side, which bridge switch device provides an alternating or direct power supply for the drive motor, wherein the power supply circuit of the drive motor is controlled by a control device for accelerating and braking the drive motor. The method there for electrically braking the drive motor comprises the steps of disconnecting the intermediate circuit from the mains and regulating the intermediate circuit voltage to a predetermined value greater than zero, wherein the intermediate circuit capacitor is fed when the drive motor operates regeneratively.

DE 10 2007 059 492 B4 discloses an industrial robot having a robot arm which has several axes and at least one electric drive with a three-phase motor and with power electronics controlling the three-phase motor, wherein the power electronics have a three-phase inverter driving the three-phase motor and an intermediate circuit which has an intermediate circuit capacitator and is connected upstream of the three-phase inverter and has a first brake resistor and a first switch; wherein the electric drive is configured to move the relevant axis; wherein the industrial robot is configured to short-circuit the three-phase motor simultaneously by means of two, mutually independent electric current paths within the scope of an emergency braking, and to close the first switch during emergency braking in order to connect the brake resistor in parallel with the intermediate circuit capacitor, so that one of the two electric current paths for emergency braking runs through the first brake resistor.

SUMMARY

The object of the invention is to achieve a method for controlling at least one servomotor by means of a converter, which method works particularly effectively and safely.

The object is achieved by a method for controlling at least one servomotor by means of a converter comprising:
an input circuit connected to an electrical grid,
a direct-voltage DC link that can be fed from the input circuit,
a first switching device which is designed, in its switched-on state, to feed the direct-voltage DC link with electrical energy from the input circuit and, in its switched-off state, to prevent a feed of the direct-voltage DC link from the electrical grid, so that no electrical energy from the electrical grid reaches the direct-voltage DC link,
at least one inverter circuit which can be fed from the direct-voltage DC link and has controllable power semiconductor switches for electrically controlling the servomotor, and
a second switching device which is designed, in its switched-on state, to feed the servomotor with electrical energy from the inverter circuit in order to drive the servomotor, and, in its switched-off state, to prevent driving of the servomotor, so that no electrical energy driving the servomotor goes from the inverter circuit to the servomotor, having the steps of:
monitoring a circuit, connected to the input circuit, of the direct-voltage DC link for the flow of an electric current,
if a stop signal occurs, switching off the first switching device in order to end the supply of the direct-voltage DC link from the electrical grid,
braking the servomotor by controlling the power semiconductor switches of the inverter circuit in a regenerative braking operation, or via a short-circuit braking, in order to reduce the rotation speed of the servomotor, in the event that, after the first switching device has been switched off, the monitoring detects that an electric current is not flowing in the circuit, connected with the input circuit, of the direct-voltage DC link,
switching off the second switching device in order to prevent a feeding of electrical energy from the direct-voltage DC link into the servomotor in the event that, after the first switching device has been switched off, the monitoring detects a flow of electric current in the circuit, connected with the input circuit, of the direct-voltage DC link.

Although frequency converters are generally used as converters in which an electrical alternating-current grid is used which feeds the direct-voltage DC link of the frequency converter, the invention can also be used in converters which are fed by a DC voltage grid. In this case, no rectifier circuit is required on the input side, since, due to the DC voltage grid, no alternating voltage needs to be rectified before the electrical energy can be supplied to the direct-voltage DC link. The input circuit can therefore be of very simple design and, for example, can be formed by just the first switching device alone.

In most current applications, in which it is not yet customary for a powerful DC voltage grid to be available, the invention can be realized in the embodiment of a frequency converter which is fed by an electrical alternating-current grid and which has a rectifier circuit as an input circuit.

The object can thus be specifically achieved by a method in which the converter is designed as a frequency converter, the electrical grid is an alternating-voltage grid, and the input circuit is designed as a rectifier circuit, having the steps of:
monitoring a circuit, connected to the rectifier circuit, of the direct-voltage DC link for the flow of an electric current, if a stop signal occurs, switching off the first switching device in order to end the supply of the direct-voltage DC link from the alternating-voltage grid, braking the servomotor by controlling the power semiconductor switches of the inverter circuit in a regenerative braking operation, or via a short-circuit braking, in order to reduce the rotation speed of the servomotor, in the event that the monitoring detects that an electric current is not flowing, after the first switching device has been switched off, in the circuit, connected with the rectifier circuit, of the direct-voltage DC link, switching off the second switching device in order to prevent a feeding of electrical energy from the direct-voltage DC link into the servomotor in the event that, after the first switching device has been switched off, the monitoring detects a flow of electric current in the circuit, connected with the rectifier circuit, of the direct-voltage DC link.

In the event of a frequency converter with feed from an electrical alternating-voltage grid with an input-side rectifier circuit, it can be provided that the rectifier circuit be designed as a controlled, three-phase current bridge (B6C) in which thyristors instead of diodes are used as rectifying components. Thyristors are switchable components which in the initial state are non-conductive, i.e., switched off, and can be switched on by a control current at the gate electrode of the thyristor. After switching on, the thyristor remains conductive, i.e., switched on, even without a current present at the gate electrode. The thyristor is switched off by falling below a minimum passage current—what is known as the holding current. In a specific embodiment, it is in this regard provided that the first switching device be formed by the controllable thyristors of the rectifier circuit designed as a controlled, three-phase current bridge (B6C).

In another embodiment—in particular, in an embodiment of the rectifier circuit as an uncontrolled, three-phase current bridge (B6U)—the rectifier circuit can have non-controllable diodes, and the first switching device can be formed by separate switches. These switches, which are separate from the rectifier circuit, can also be formed by semiconductor components, but possibly also by electromechanical switches. The switches separate from the rectifier circuit can in particular have the advantage that the direct-voltage DC link can be galvanically isolated from the electrical grid.

The object is therefore also achieved in particular by a method for controlling at least one servomotor by means of a frequency converter, which method comprises:

a rectifier circuit connected to an electrical alternating-voltage grid, a direct-voltage DC link that can be fed from the rectifier circuit, a first switching device which is designed, in its switched-on state, to feed the direct-voltage DC link with electrical energy from the rectifier circuit and, in its switched-off state, to electrically disconnect the direct-voltage DC link from the rectifier circuit so that no electrical energy goes from the rectifier circuit to the direct-voltage DC link, at least one inverter circuit which can be fed from the direct-voltage DC link and has controllable power semiconductor switches for electrically controlling the servomotor, and a second switching device which is designed, in its switched-on state, to feed the servomotor with electrical energy from the inverter circuit and, in its switched-off state, to electrically disconnect the servomotor from the inverter circuit so that no electrical energy goes from the inverter circuit to the servomotor, having the steps of:

monitoring a circuit, connected to the rectifier circuit, of the direct-voltage DC link for the flow of an electric current, if a stop signal occurs, switching off the first switching device in order to electrically disconnect the direct-voltage DC link from the rectifier circuit, braking the servomotor by controlling the power semiconductor switches of the inverter circuit in a regenerative braking operation, in order to reduce the rotation speed of the servomotor, in the event that the monitoring detects that an electric current is not flowing, after the first switching device has been switched off, in the circuit, connected with the rectifier circuit, of the direct-voltage DC link, switching off the second switching device, in order to electrically disconnect the inverter circuit from the servomotor, in the event that, after the first switching device has been switched off, the monitoring detects a flow of an electric current in the circuit, connected with the rectifier circuit, of the direct-voltage DC link.

In principle, the method according to the invention can be carried out by controlling a single servomotor. However, the method according to the invention can be carried out in particular by controlling at least two servomotors. In the special embodiment of the control of drives of a robot arm, the method according to the invention can be implemented, for example, by controlling six or seven servomotors, which form the drives of a robot arm.

According to the invention, what is understood by a braking according to the method is in particular that, during the implementation of the method, the one servomotor or the several servomotors are braked neither by mechanical brakes nor by (electro)mechanical brakes; rather, during the implementation of the method—in particular, in a regenerative operation, actively controlled by the inverter circuit, of the one servomotor or of the several servomotors—at all events, braking takes place electrically via a short-circuit braking. In such an actively-controlled, regenerative operation of one servomotor or the several servomotors, the inverter circuit is thus fed with electrical energy from the direct-voltage DC so that, by switching the activation of the semiconductor switches of the inverter circuit on and off, corresponding alternating currents can be introduced into the windings of one servomotor or of the several servomotors, which alternating currents generate magnetic fields that produce braking mechanical forces on the servomotor shaft or shafts. Braking means reducing the speed of the respective servomotor shaft. Braking does not necessarily have to be carried out until the corresponding servomotor shaft has come to a complete standstill. Rather, braking can be carried out only from a higher first speed to a lower second speed, which is lower than the first speed. However, a braking can specifically be implemented up until a complete standstill.

In the case of two or more servomotors which are controlled according to one of the methods according to the invention, it is not necessary that all servomotors be controlled in a braking manner at the same time. Rather, at any points in time, a first subgroup of a subset of servomotors can be selectively controlled in a braking manner, and a second subgroup of another subset of servomotors, stationary at a constant velocity, can be undriven, i.e., be run idle, or even be accelerated. In a special state, only a single servomotor can be controlled in a regenerative braking manner, and the other servomotors cannot be controlled in a regenerative braking manner. In a particular state, all of the servomotors can be controlled in a regenerative braking manner at the same time.

The position (the motor position, i.e., the current angular position of the motor shaft), speed, acceleration, and/or braking behavior (negative acceleration) of the at least one servomotor is controlled electrically by means of the frequency converter according to the invention. In the case of two or more servomotors, the frequency converter has a number of inverter circuits corresponding to the number of servomotors. The several inverter circuits can thereby be connected to a common direct-voltage DC link. The common direct-voltage DC link is then fed by a common rectifier circuit from the same electrical alternating-voltage grid when the frequency converter is connected to the electrical alternating-voltage grid.

The electrical alternating-voltage grid provides electrical energy from an energy grid of an energy supplier. In general, this will be a low-voltage grid. The low-voltage grid can in particular be a three-phase, alternating-voltage grid. The three-phase, alternating-voltage grid supplies a sinusoidal alternating supply voltage. This sinusoidal alternating supply voltage can in particular have an effective value at which a voltage of, for example, 230 volts is present between an outer conductor of the three-phase, alternating-voltage grid and a neutral conductor of the three-phase, alternating-voltage grid, and a voltage of, for example, 400 volts is present between any two of the three outer conductors. The grid frequency can be 50 Hertz or 60 Hertz, for example. In particular, the three-phase, alternating-voltage grid can be configured as a TN system comprising three external conductors (L1, L2, L3), a neutral conductor (N), and a protective conductor (PE).

The rectifier circuit of the frequency converter can be a three-phase rectifier, for example. The three-phase rectifier can be implemented in the form of an uncontrolled, three-phase bridge.

The direct-voltage intermediate circuit is fed with electrical energy from the electrical alternating-voltage grid when the frequency converter is connected to the electrical alternating-voltage grid. If the direct-voltage DC link is disconnected from the electrical alternating-voltage grid, the direct-voltage DC link is supplied exclusively by electrical energy from the inverter circuit, which can deliver electrical energy when the at least one servomotor is operated regeneratively.

In the operating times in which the method according to the invention can be implemented, electrical energy can, moreover, be discharged from the intermediate circuit capacitor, and in fact either to the inverter circuit or to a brake resistor of the direct-voltage DC link.

In such an instance, when it is connected to the direct-voltage DC link, the brake resistor is designed to draw electrical energy from the direct-voltage DC link and to convert it into heat. When it is disconnected from the direct-voltage intermediate circuit, the brake resistor has no electrical effect on the direct-voltage intermediate circuit, i.e., the direct-voltage intermediate circuit remains unaffected by the brake resistor when the brake resistor is disconnected. A brake chopper, via which the brake resistor can be connected to and/or disconnected from the direct-voltage DC link, is a controllable switch. To this extent, the brake chopper can be operated in a pulse-width-controlled manner.

The inverter circuit fed from the direct-voltage intermediate circuit comprises semiconductor switches that can be controlled electronically—for example, by associated driver circuits. The inverter circuit can be a three-phase inverter and can be designed, for example, as a two-stage inverter (U-inverter) or a pulse-controlled inverter. In the inverter circuit, the semiconductor switches carry the electrical energy to the servomotor when the current and voltage have the same sign. The electrical energy thus flows out of the direct-voltage intermediate circuit and into the servomotor. In a regenerative operation, it can be provided that the freewheeling diodes associated with the power semiconductor switches not dissipate the electrical energy, in order to return regenerative energy from the servomotor or servomotors to the direct-voltage DC link, i.e., to the intermediate circuit capacitor; rather, the semiconductor switches can remain active and can be controlled in accordance with driver circuits associated with the power semiconductor switches, in order to draw electrical energy from the servomotors and feed it into the direct-voltage DC link, i.e., into the intermediate circuit capacitor.

In the method according to the invention, a disconnection of the direct-voltage DC link from the electrical alternating-voltage grid takes place. This is, for example, in the event of an emergency shutdown of the respective machine that is driven by the at least one servomotor, at least expedient or even absolutely necessary in view of certain safety requirements to be observed.

For example, with industrial robots, in the event of a Category 0 emergency stop (e.g., according to the EN 60204-1 standard), an immediate interruption of the electrical energy supply is prescribed—in particular, if, for example, mechanical disconnection, i.e., a decoupling in the drive train and/or mechanical braking alone, is not possible.

On the other hand, a machine, such as the example of an industrial robot, can have system states in which a controlled speed reduction of the servomotors—in particular, down to a standstill at zero speed—takes place more quickly than by mere mechanical braking, in which the servomotors are not controlled in their speeds. In such an instance, a Category 0 stop or Category 1 stop (e.g., according to the EN 60204-1 standard) can be performed in which a controlled shutdown of the machine is performed, wherein the supply of electrical energy to the servomotors is maintained in order to enable the controlled shutdown. The supply of electrical energy is only interrupted when the standstill of the servomotor or of the several servomotors is achieved.

However, for both the Category 0 emergency stop and the Category 1 stop, it can be provided that an STO functionality (Safe-Torque-Off according to the EN 61800-5-2 standard) associated with the servomotors or integrated into the servo drives be additionally used.

The first switching device can be a first relay—in particular, a first relay with positively-guided switching contacts—a first contactor—in particular, with doubly- or multiply-interrupting switching contacts. Alternatively or additionally, the second switching device can be a second relay—in particular, a second relay with positively-guided switching contacts—a second contactor, with doubly- or multiply-interrupting switching contacts.

Although the first switching device and also the second switching device can in general be designed as mechanical switches, in a development according to the invention, it is specifically proposed that the first switching device be designed as a first semiconductor switching device, and/or the second switching device be designed as a second semiconductor switching device. In the embodiment as a semiconductor switching device, the first semiconductor switching device and/or the second semiconductor switching device can, for example, comprise one or more transistors—in particular, MOSFET's—and/or one or more thyristors—in particular, GTO thyristors.

Depending upon the embodiment, the first switching device can be formed in particular by the controllable thyristors of the rectifier circuit designed as a controlled, three-phase current bridge (B6C). Alternatively or additionally, the second switching device can be formed in particular by the power semiconductor switches of the inverter circuit of the converter. To this extent, separate switches, i.e., of the rectifier circuit and/or of switches different from the inverter circuit, can be omitted.

Both in the embodiment as a relay-like, electromechanical switch and in the embodiment as semiconductor switching devices, the first switching device and the second switching device can be designed to be singly switching, i.e., not redundantly switching.

The first switching device—in particular, the first semiconductor switching device—can be configured so as to be switching in the circuit of the rectifier circuit and the direct-voltage DC link such that, even if the first switching device is switched off, the rectifier circuit continues to remain connected to the electrical alternating-voltage grid.

Depending upon the structural embodiment of the electromechanical relays and, in any event, in the embodiment as semiconductor switching devices, the first switching device and the second switching device disconnect in an unsafe manner, since, possibly, no galvanic isolation from the alternating-voltage grid takes place.

In a specific embodiment of the method, a safe stop function is therefore achieved in that the circuit, connected to the rectifier circuit, of the direct-voltage DC link is monitored for a flow of an electric current. If a stop signal occurs, the first switching device is switched off in order to electrically disconnect the direct-voltage DC link from the rectifier circuit. If the monitoring of the circuit, connected to the rectifier circuit, of the direct-voltage DC link then detects a flow of an electric current, after the first switching device is switched off, by means of the monitoring of the detected non-flow of an electric current in the circuit, connected to the rectifier circuit, of the direct-voltage DC link, a braking of the servomotor is performed by controlling the power semiconductor switches of the inverter circuit in a regenerative braking operation in order to reduce the rotation speed of the servomotor. However, if the monitoring of the circuit, connected to the rectifier circuit, of the direct-voltage DC link for a flow of an electric current detects, after the first switching device has been switched off, a flow of an electric current in the circuit, connected to the rectifier circuit, of the direct-voltage DC link, meaning that the monitoring continues to detect an electric current despite switching off, an STO functionality (Safe-Torque-Off according to the EN 61800 standard) is activated which directly interrupts the electrical energy supply to the servomotor or to the servomotors.

In known regulated drive systems with an intermediate circuit, a deactivation of the energy flow from the supply system, i.e., from the alternating-voltage grid via the intermediate circuit into the driving system, i.e., the servomotors, is required to achieve certain requirements for functional safety. In the prior art, the deactivation of the energy flow into the driving system is realized via a switching element at the input of the rectifier circuit, i.e., via a feed unit. Electromechanical or electronic elements can be used as a switching element.

However, given deactivation of the energy flow through the feed unit, this must be monitored or even redundantly executed, corresponding to the functional safety requirements. A direct monitoring of the energy flow does not take place, according to the known prior art.

Alternatively, the energy flow through the actuating device can be deactivated. In this event, however, the actuating device cannot be used to quickly stop the driving system—for example, to implement a ramp stop.

Insofar as the feed unit possesses an electromechanical switching element (e.g., a main contactor), a safety-related deactivation can take place via this contactor. However, in an embodiment of the feed unit from a diode rectifier or a semi-controlled thyristor bridge without an additional switching element, the power supply cannot be deactivated according to functional safety rules.

With the method according to the invention, a safety-oriented energy cutoff can optionally take place in the feed unit, i.e., at the rectifier circuit, and in fact especially on the basis of semiconductor components or without the addition of electromechanical switches.

Due to wear and low reliability, electromechanical switching elements are, optimally or largely, to be omitted.

In comparison with the prior art, the energy flow from the feed unit into the intermediate circuit is monitored. The deactivation of the energy flow into the driving system takes place via an, in particular, non-redundant switch in the feed unit, i.e., in particular, via the thyristors of the rectifier circuit designed as a controlled, three-phase current bridge (B6C). By deactivating the energy flow in combination with a monitoring of this energy flow, the actuating device can still be controlled in a regulated manner instead of otherwise only being switched off. The advantage over the prior art is the faster and, depending upon the operating situation, adapted stopping of the driving system.

The power flow is deactivated at the feed unit. The energy flow is monitored by a measuring device in the intermediate circuit to zero, or to a defined threshold value. This monitoring can take place via a measuring device in the inflow or in the return flow, or in both simultaneously. If the energy flow from the feed unit into the intermediate circuit is zero, the driving system can still be down-regulated in a controlled manner via an actuating device with the residual energy of the intermediate circuit.

In running operation, the measuring device can be continuously monitored, since, here, the energy flow is continuously detected. The functionality of the measuring device can thus be constantly checked for plausibility. If it is determined, by means of the measuring device, that the feed unit has not correctly disconnected the energy flow from the supply system, then it can still be switched off directly via a second actuating device at the inverter circuit.

The monitoring of the circuit, connected to the rectifier circuit, of the direct-voltage DC link for a flow of an electric current can be performed by a single current measurement in one of the two lines, connecting the rectifier circuit to the direct-voltage DC link, of the circuit.

The current measurement can, for example, be carried out by means of one or more current sensors galvanically isolated from the circuit, or by means of one or more measuring resistors (shunts) connected to the circuit. The current sensor or the current sensors, or the measuring resistor or the measuring resistors, can thereby be connected to the control device, which performs the monitoring and/or evaluation.

Alternatively, the monitoring of the circuit, connected to the rectifier circuit, of the direct-voltage DC link for a flow of an electric current can be performed redundantly via a duplicate current measurement, both in the one line (forward line), connecting the rectifier circuit to the direct-voltage DC link, of the circuit and in the other line (return line), connecting the rectifier circuit to the direct-voltage DC link, of the circuit.

The inasmuch redundant current measurement can, for example, be implemented by means of two or more current sensors galvanically isolated from the circuit, or by means of two or more measuring resistors (shunts) connected to the circuit. The current sensors and/or the measuring resistors can thereby, moreover, optionally be of diverse design. For example, a current sensor and a measuring resistor can be provided for a redundant current measurement.

In all embodiment variants of the method, the monitoring of the circuit, connected to the rectifier circuit, of the direct-voltage DC link for the flow of an electric current during running operation of the frequency converter can also be implemented during operational control of the servomotor, independently of the presence of a stop signal. The monitoring during the operational control of the servomotor, independently of the presence of a stop signal, can be implemented intermittently, i.e., in discrete time intervals—in particular, uniform time intervals. Alternatively, the monitoring can be performed continuously, i.e., without interruption or permanently, during the operational control of the servomotor, independently of the presence of a stop signal.

Because the monitoring of the circuit, connected to the rectifier circuit, of the direct-voltage DC link for the flow of an electric current is implemented during running operation of the frequency converter, even during the operational control of the servomotor, independently of the presence of a stop signal, an ongoing plausibility check of the current sensors and/or the measuring resistors can be performed. Thus, in the operational control of the at least one servomotor, the electrical energy necessary or required due to the instantaneous activation can be determined, and the instantaneously required electric current can be derived therefrom in its nominal variable and be compared with the current values detected by the current sensors and/or the measuring resistors. In the event of a deviation of the measured current values from the expected current values beyond a tolerable difference, a malfunction of the current measurement—in particular, a malfunction of the current sensors and/or of the measuring resistors—can be inferred. Consequently, the certainty of the monitoring or of the current measurement can be continuously checked, and, in the event of a malfunction, a safe state can thus be initiated, even at points in time at which the stop function is not yet triggered.

The magnitude of the amperage in a forward line in the direct-voltage DC link can be compared directly for uniformity with the magnitude of the amperage in a return line in the direct-voltage DC link; or the current profiles detected by the monitoring of the circuit, connected to the rectifier circuit, of the direct-voltage DC link for the flow of an electric current can be compared with control signals for the frequency converter and/or with current and/or voltage profiles between the inverter circuit and the servomotor, wherein information about the functionality of an electric component performing the monitoring can be derived from the comparison. In a preferred type of monitoring, the magnitude of the amperage in a forward line in the direct-voltage DC link can be compared directly for uniformity with the magnitude of the amperage in a return line in the direct-voltage DC link.

The electrical component performing a monitoring can, for example, be a current sensor galvanically separated from the circuit, or a measuring resistor (shunt) connected to the circuit.

The object according to the invention is also achieved by a control device for controlling at least one servomotor by means of a frequency converter, having: a detection device for detecting current and/or voltage profiles in a circuit of a direct-voltage DC link of the frequency converter, said circuit being connected to a rectifier circuit of the frequency converter; a signal input for receiving a stop signal of a machine controller controlling the servomotor; a first signal output for controlling a first switching device of the frequency converter, which is designed, in its switched-on state, to feed the direct-voltage DC link with electrical energy from the rectifier circuit, and, in its switched-off state, to electrically disconnect the direct-voltage DC link from the rectifier circuit so that no electrical energy goes from the rectifier circuit to the direct-voltage DC link; and a second signal output for controlling a second switching device of the frequency converter, which is designed, in its switched-on state, to feed the servomotor with electrical energy from an inverter circuit of the frequency converter, and, in its switched-off state, to electrically disconnect the servomotor from the inverter circuit so that no electrical energy goes from the inverter circuit to the servomotor; wherein the control device is designed to implement a method according to the invention according to one or more of the described embodiments.

The control device can have a detection device which comprises at least one current sensor, wherein the detection device is designed to implement a single current measurement in one of the two lines, connecting the rectifier circuit to the direct-voltage DC link, of the circuit.

For example, the detection device can receive, i.e., detect, measured values of one or more current sensors galvanically isolated from the circuit, or measured values of one or more measuring resistors (shunts) connected to the circuit. The current sensor or the current sensors, or the measuring resistor or the measuring resistors, can thereby be connected to the control device, which performs the monitoring and/or evaluation.

The control device can have a detection device which comprises two current sensors, wherein the detection device is designed to redundantly and/or diversely implement a dual current measurement both in the one line, connecting the rectifier circuit with the direct-voltage DC link, of the circuit and in the other line, connecting the rectifier circuit with the direct-voltage DC link, of the circuit.

For example, the inasmuch redundantly designed detection device can receive, i.e., detect, measured values of two or more current sensors galvanically isolated from the circuit, or measured values of two or more measuring resistors (shunts) connected to the circuit. The current sensors and/or the measuring resistors can thereby be connected to the control device, which performs the monitoring and/or evaluation. The current sensors and/or the measuring resistors can thereby, moreover, optionally be of diverse design. For example, a current sensor and a measuring resistor can be provided for a redundant current measurement.

In the application case of an exemplary robot arm, the robot arm can have several joints and several links which can be adjusted relative to one another by the movements of the joints of the robot arm. Each joint can be assigned its own servomotor. Each of the several servomotors is designed to adjust the joint of the robot arm assigned thereto—specifically by automatically controlling the servomotor. For this purpose, the robot arm can have a control device which is designed to automatically control the servomotors of the robot arm in order to automatically adjust the links of the robot arm in relation to one another by moving the joints in a driven manner.

Each joint and thus each servomotor assigned to this respective joint moves a kinematic system which is formed by the distal kinematic subsystem upstream of this servomotor in the kinematic chain of the robot arm. In general, the servomotors arranged more proximally in the kinematic chain (servomotors of the basic axes of the robot arm) have to brake more kinetic energy than the servomotors arranged more distally (servomotors of the hand axes of the robot arm). However, at any given time, depending upon the pose of the robot arm's joints, another servomotor may be loaded with the momentarily highest braking load. For example, a situation may arise where a base joint moving upwards against gravity is to be braked, and thus the braking force is largely provided by gravity, and the associated servomotor is therefore not subjected to any particular electrical braking load. On the other hand, a rather light wrist of the robot arm can move in the direction of gravity, so that when braking, the acting gravitational acceleration must also be counteracted by the servomotor, and this servomotor, which is assigned to the lighter wrist, is therefore subjected to a particularly high electrical braking load.

The object according to the invention is thus moreover achieved by a robot having a robot arm with several joints and several links which can be adjusted relative to one another via the movements of the joints of the robot arm, wherein a servomotor is associated with at least one of the joints, which servomotor is designed to adjust the at least one joint, viz., via automatic control of the servomotor, and having a robot controller which is designed to automatically control at least one servomotor of the robot arm in order to automatically adjust the links of the robot arm in relation to one another via driven movement of the joints, wherein the robot controller comprises a control device according to the invention as described according to one or more embodiments, or is connected in terms of control with a control device as described according to one or more embodiments.

The at least one servomotor can specifically be a permanent-magnet synchronous machine.

The control device can be designed as part of a robot controller. Alternatively, however, the control device can also be designed as a separate control unit that interacts with the robot controller—for example, by means of a communication link. The control device is designed in particular to control a frequency converter, which comprises: a rectifier circuit that can be connected to an electrical alternating-voltage grid; a direct-voltage DC link with an intermediate circuit capacitor, said direct-voltage DC link being fed from the electrical alternating-voltage grid in the state in which it is connected to an electrical alternating-voltage grid, and having a brake resistor that can be connected to and disconnected via a brake chopper of the direct-voltage DC link; and at least one inverter circuit with controllable semiconductor switches, which inverter circuit is fed from the direct-voltage DC link.

The object according to the invention is, moreover, achieved by a computer program product having a machine-readable medium on which program code is stored, which can be read by a control device according to the invention as described according to one or more embodiments, and which instructs and/or configures the control device to implement a method according to the invention as described according to one or more embodiments if the program code is executed by the control device.

The computer program product can be a CD, a DVD, or a USB stick, for example. However, the computer program product can also be a control card on which microprocessors are integrated. However, the computer program product can also be implemented in the form of a download that can be offered and sold over the Internet or another network.

The machine-readable carrier can thus be a CD, a DVD, or a microprocessor on which the program code is stored. However, the machine-readable carrier can also be a hard disk or an SSD drive onto which the program code has been downloaded, e.g., by means of a download—in particular, in the form of data packets.

The program code may be represented by an edited program and/or data stored on the machine-readable carrier.

By reading the edited program and/or the data, the reading control device is designed and/or configured to be able to carry out the method according to the invention.

The method according to the invention is carried out when the control device actually executes the program code, i.e., the edited program, and/or actually processes the data accordingly.

Specific embodiments of the invention are explained in more detail in the following description with reference to the accompanying figures. Specific features of these embodiments, possibly considered individually or in further combinations, can represent general features of the invention, regardless of the specific context in which they are mentioned.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
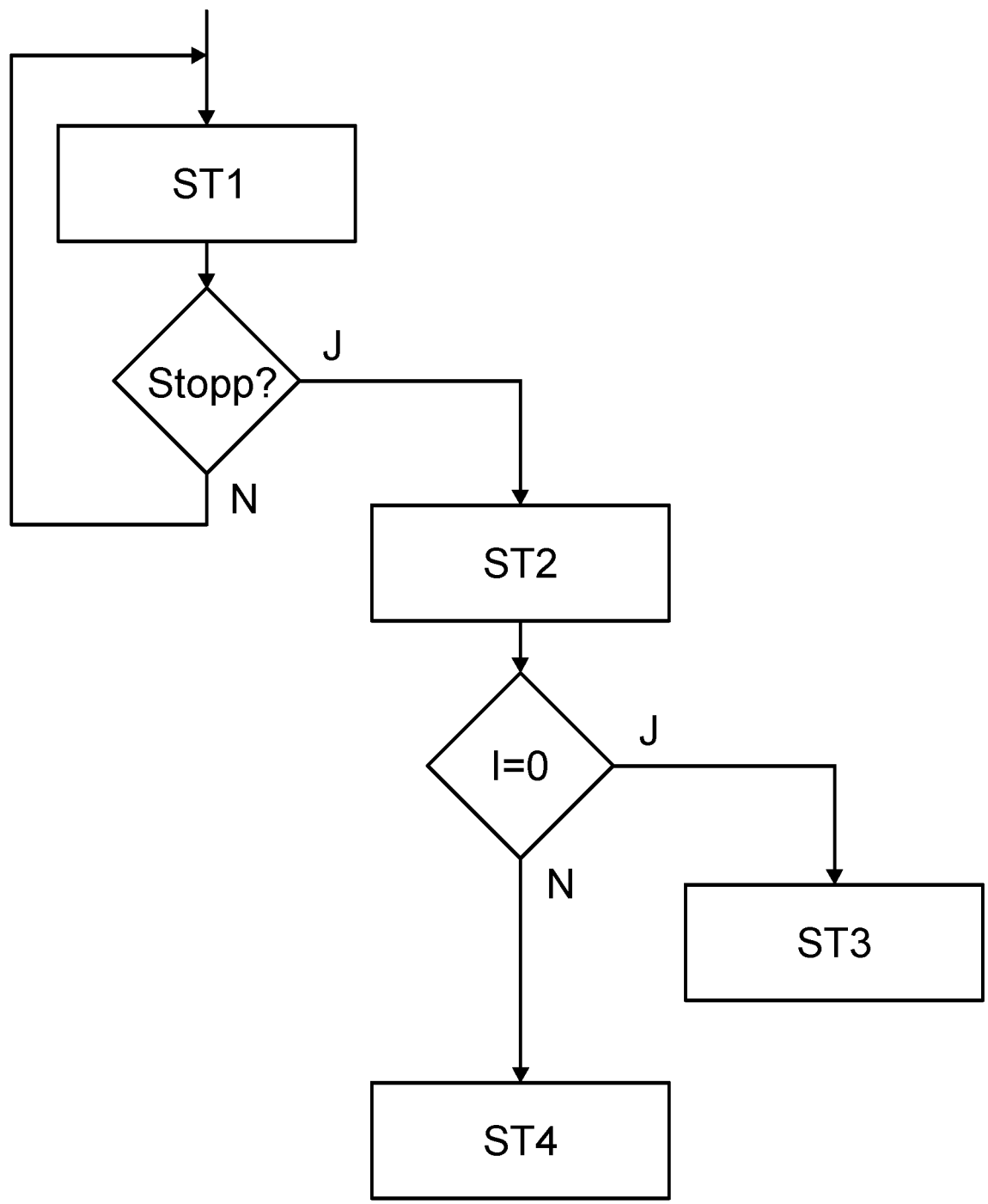
FIG. 1 shows a workflow diagram of an exemplary method according to the invention.
Figure 3:
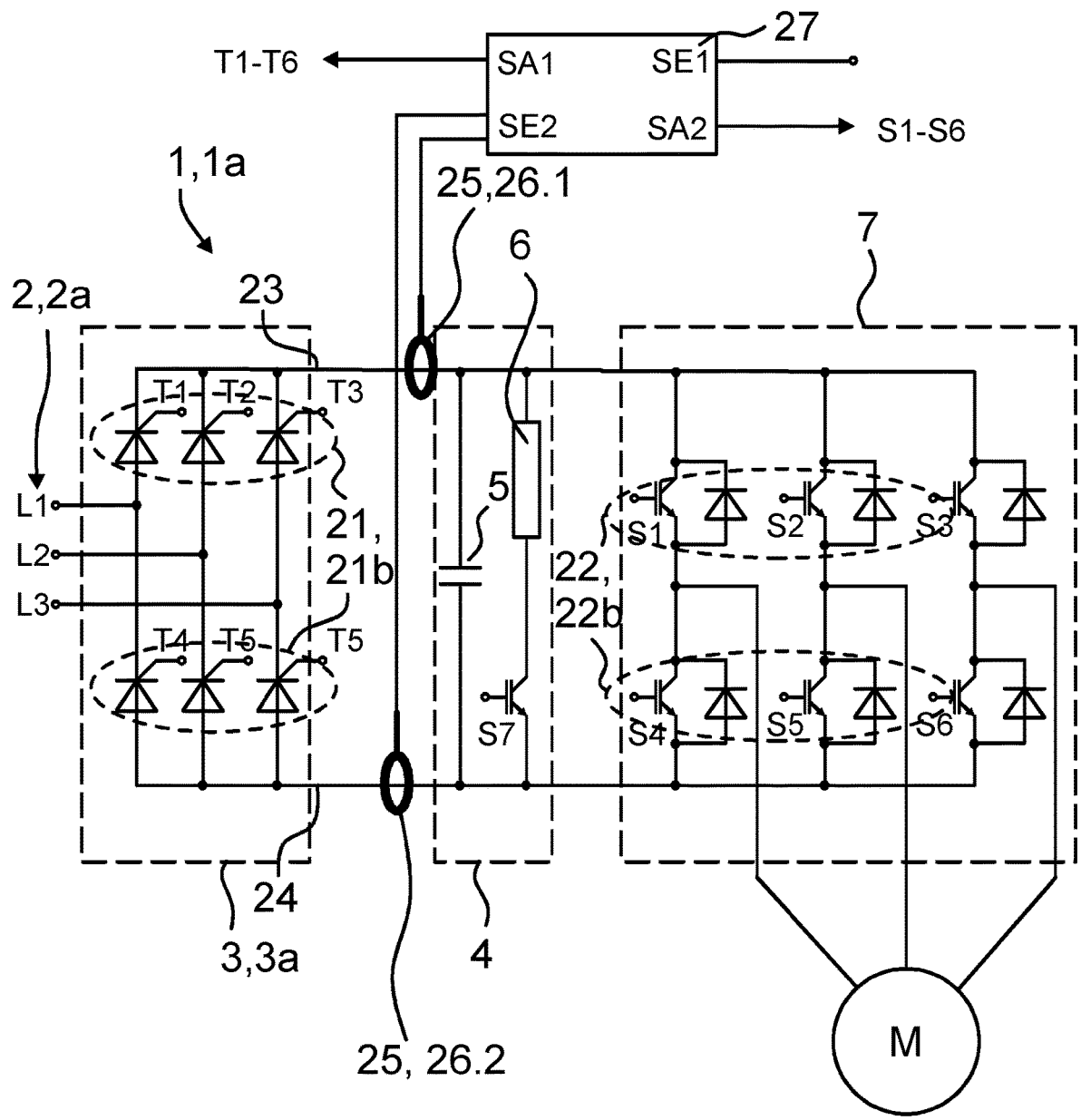
FIG. 3 shows a schematic depiction of a circuit diagram of an exemplary frequency converter with an exemplary single servomotor and a first switching device realized by the thyristors of the rectifier circuit.
Figure 4:
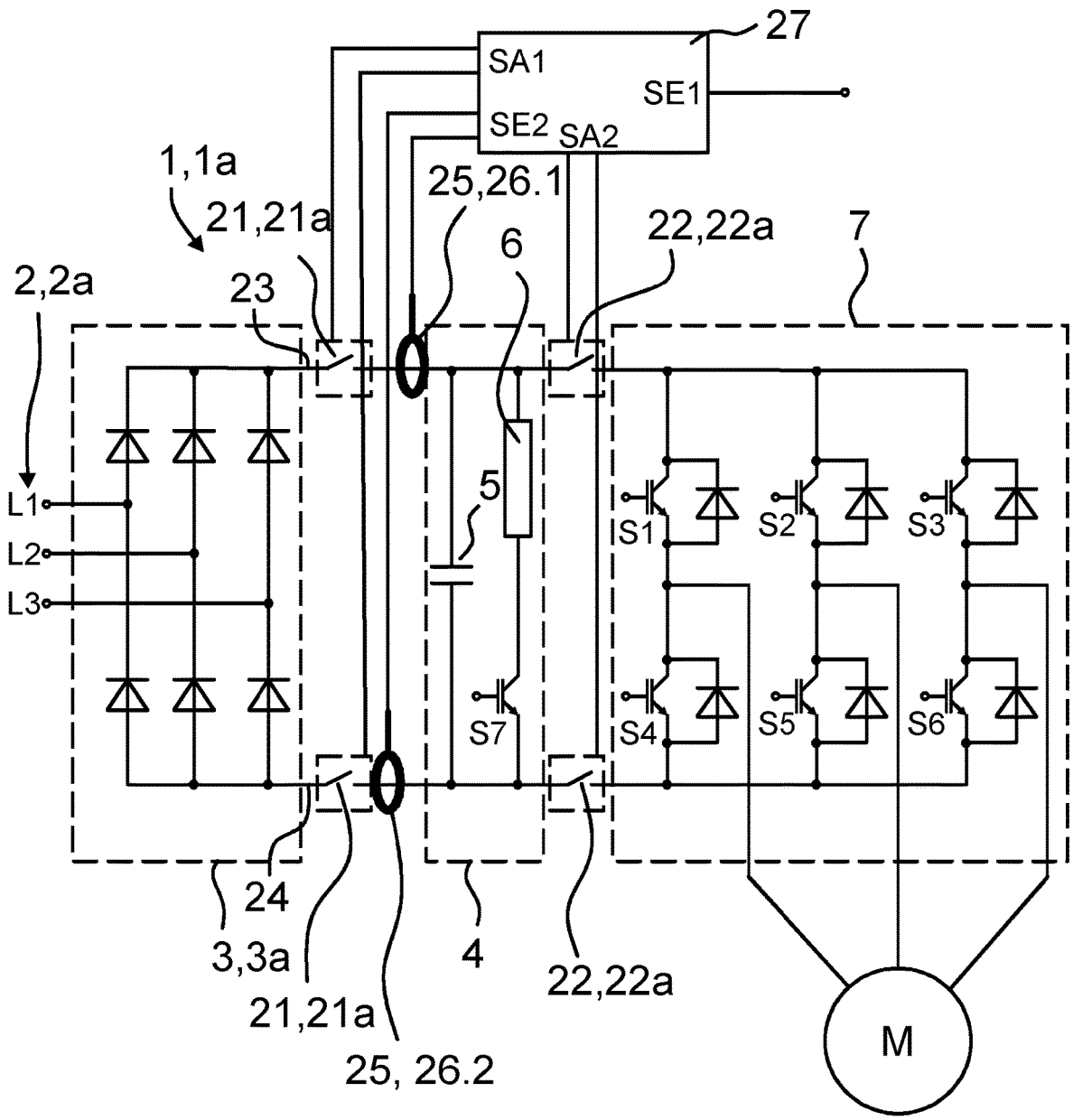
FIG. 4 shows a schematic depiction of a circuit diagram of a modified frequency converter with a servomotor, and a first switching device separate from the rectifier circuit, and a second switching device separate from the inverter circuit.

Schematically shown in FIG. 1 is the workflow of an exemplary method according to the invention for controlling at least one servomotor M by means of a frequency converter 1 (FIG. 3, FIG. 4).

As is shown in FIG. 3 and FIG. 4, the frequency converter 1 can comprise:
a rectifier circuit 3 which is connected to an electrical alternating-voltage grid 2; a direct-voltage DC link 4 which can be fed from the rectifier circuit 3; a first switching device 21 which is designed, in its switched-on state, to feed the direct-voltage DC link 4 with electrical energy from the rectifier circuit 3, and, in its switched-off state, to electrically disconnect the direct-voltage DC link 4 from the rectifier circuit 3 so that no electrical energy goes from the rectifier circuit 3 to the direct-voltage DC link 4; at least one inverter circuit 7 with controllable power semiconductor switches S1-S6 for electrically controlling the servomotor M, M1-M6, which inverter circuit 7 can be fed from the direct-voltage DC link 4; and a second switching device 22 which is designed, in its switched-on state, to feed the servomotor M, M1-M6 with electrical energy from the inverter circuit 7, and, in its switched-off state, to electrically disconnect the servomotor M, M1-M6 from the inverter circuit 7 so that no electrical energy goes from the inverter circuit 7 to the servomotor M, M1-M6.

The direct-voltage DC link 4 can have an intermediate circuit capacitor 5 and a brake resistor 6 which can be connected and disconnected via a brake chopper S7 of the direct-voltage DC link 4.

The method according to the invention, as shown in FIG. 1, has the following steps:

In a first step ST1, a circuit, connected to the rectifier circuit 3, of the direct-voltage DC link 4 is monitored for the flow of an electric current.

If a stop signal occurs, in a second step ST2, the first switching device is switched off in order to electrically disconnect the direct-voltage DC link 4 from the rectifier circuit 3.

A braking of the servomotor M, M1-M6 by controlling the power semiconductor switches S1-S6 of the inverter circuit 7 in a regenerative braking operation, or via a short-circuit braking, in order to reduce the rotation speed of the servomotor M, M1-M6, takes place in a third step ST3 in the event that the monitoring detects that an electric current is not flowing, after the first switching device has been switched off, in the circuit, connected with the rectifier circuit 3, of the direct-voltage DC link 4.

In contrast, instead of the third step ST3, in a fourth step ST4, the second switching device is switched off in order to electrically disconnect the inverter circuit 7 from the servomotor M, M1-M6 in the event that, after the first switching device has been switched off, the monitoring detects a flow of an electric current in the circuit, connected with the rectifier circuit 3, of the direct-voltage DC link 4.

Figure 2:
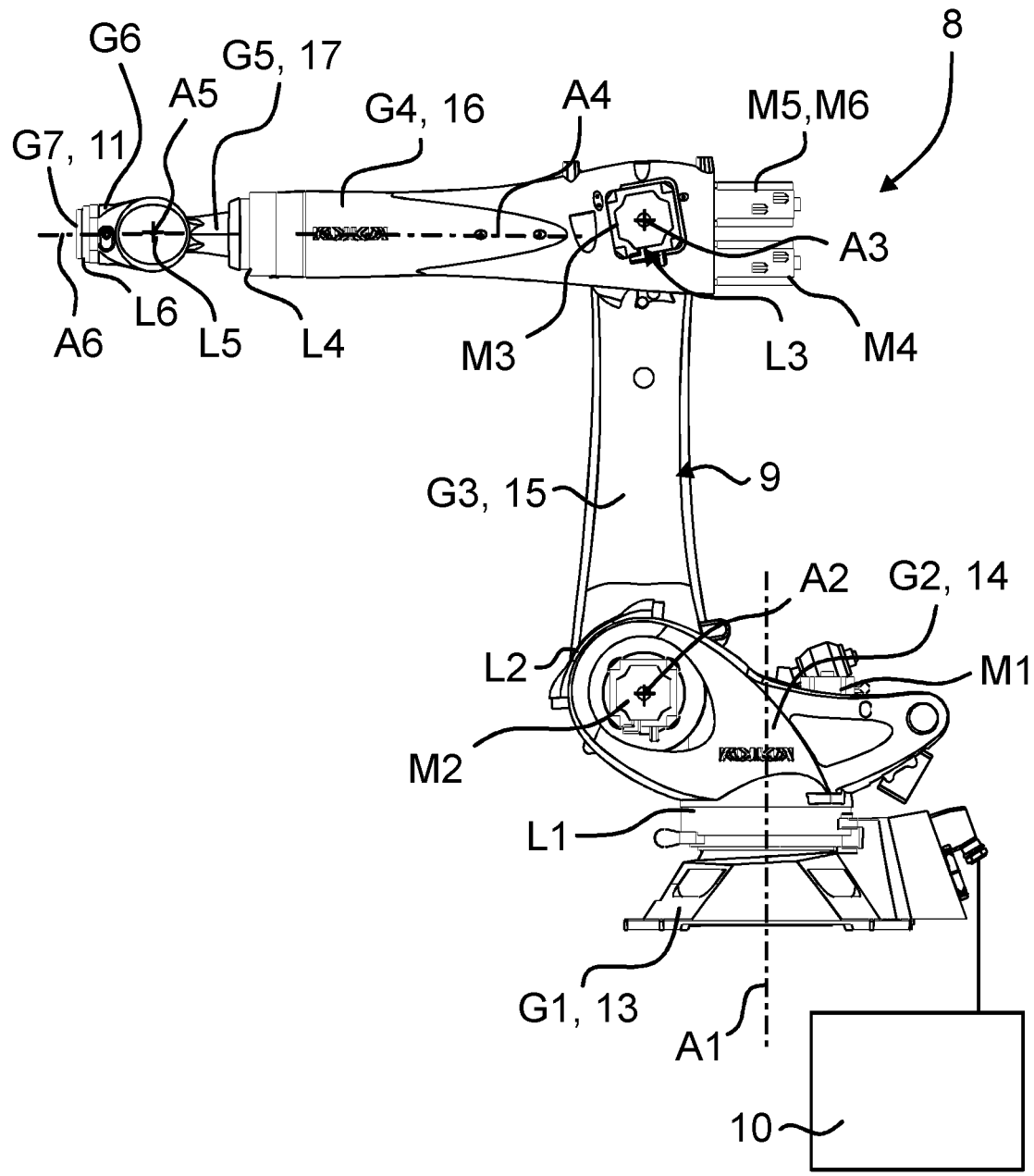
FIG. 2 shows a side view of an exemplary industrial robot, which comprises a robot arm with links, joints, and servomotors, and which has a robot controller which is designed to implement a method according to the invention.

FIG. 2 is a depiction of an industrial robot 8, which has a robot arm 9 and a robot controller 10. In the case of the present exemplary embodiment, the robot arm 9 comprises several, successively arranged links G1 through G7 connected to one another by means of joints L1 through L6 so as to be able to rotate.

The industrial robot 8 has the robot controller 10, which is designed to execute a robot program and to move the links G1-G7 and joints L1-L6 of the robot arm 9 automatically. One of the several links G1-G7 forms an end link (G7) of the robot arm 9, which has a tool flange 11.

The robot controller 10 of the industrial robot 8 is designed or configured to execute a robot program via which the links L1 through L6 of the robot arm 9 can be automated or automatically adjusted or moved in rotation in a manual mode in accordance with the robot program. For this purpose, the robot controller 10 is connected to controllable electric drives, the servomotors M1 through M6, which are designed to adjust the respective joints L1 through L6 of the robot arm 9.

In the case of the present exemplary embodiment, the links G1 through G7 are a robot base frame 13 and a carousel 14 which is borne so as to be rotatable, relative to the robot base frame 13, about a vertically-traveling axis A1. Further elements of the robot arm 9 are a link arm 15, a boom arm 16, and a preferably multi-axis robot hand 17 with a fastening device designed as a tool flange 11 for fastening a tool. The link arm 15 is mounted at the lower end on the carousel 14, i.e., at the link L2 of the link arm 15, which can also be referred to as the pivot-bearing head, so as to be pivotable about a preferably horizontal axis of rotation A2.

At the upper end of the link arm 15, the boom arm 16 is in turn mounted at the first link L3 of the link arm 15 so as to be pivotable about a likewise preferably horizontal axis A3. At its end, said boom arm supports the robot hand 17 with its preferably three axes of rotation A4, A5, A6. The links L1 through L6 can respectively be driven by a robot controller 10 in a program-controlled manner by in each case one of the electrical servomotors M1 through M6. For this purpose, a frequency converter 1 according to the invention, as shown in FIG. 3 and FIG. 4, is associated with the servomotors M1 through M6. The robot controller 10 and/or an associated separate control device can be designed to implement one or more of the methods according to the invention.

Figure 5:
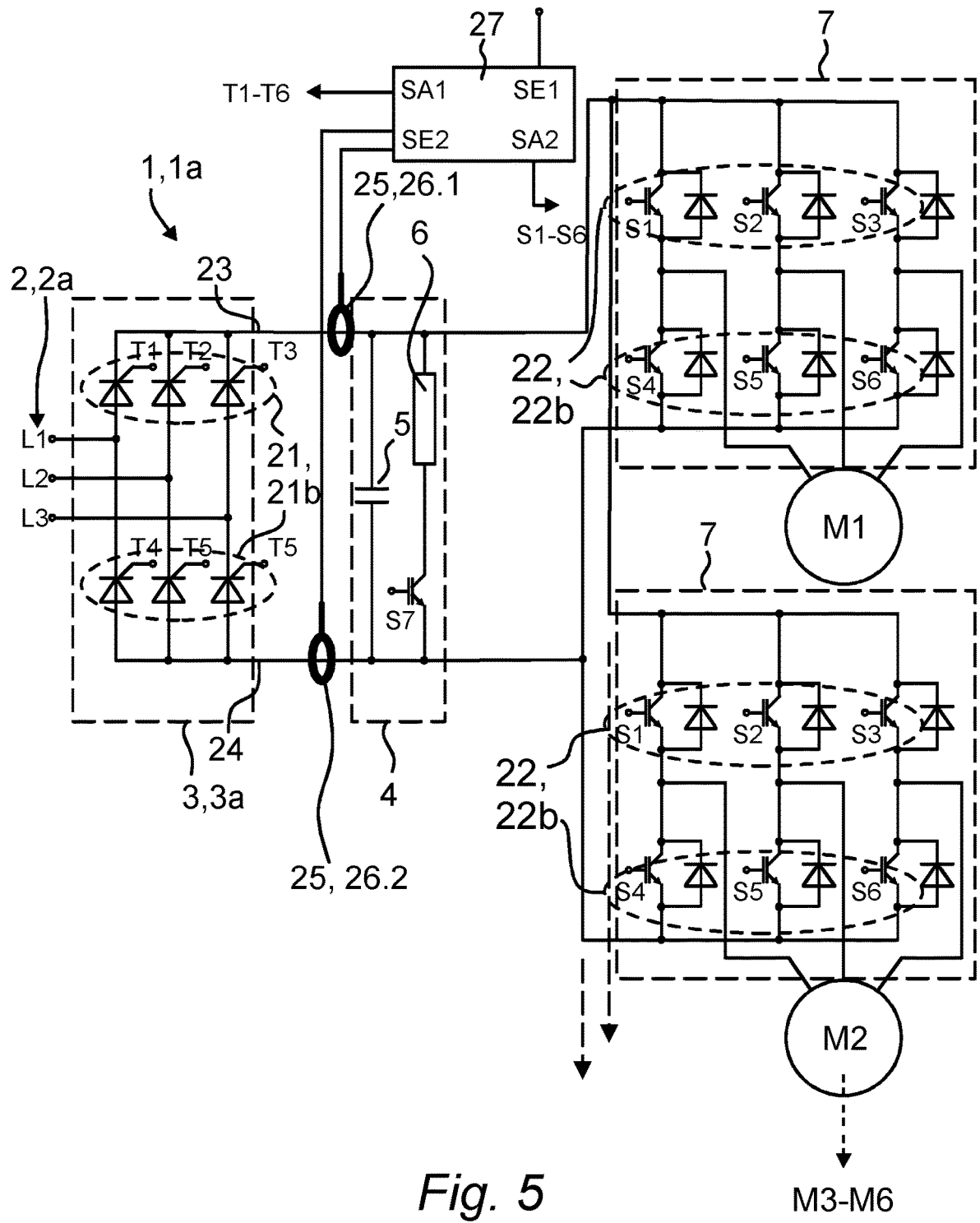
FIG. 5 shows a schematic depiction of a circuit diagram of an exemplary modified frequency converter with two or more servomotors that are connected to a common direct-voltage DC link—for example, according to FIG. 3.

The converter 1, i.e., the frequency converter 1a as shown in FIG. 3, FIG. 4, and FIG. 5, can be connectable to an electrical alternating-voltage grid 2a. The electrical alternating-voltage grid 2a can be a three-phase, alternating-voltage grid—for example, of 50 Hertz. In particular, it can be configured as a TN system.

If the frequency converter 1a is connected to the grid 2, i.e., to the alternating-voltage grid 2a, its input circuit 3, i.e., the rectifier circuit 3a, can convert the alternating voltage fed from the electrical alternating-voltage grid 2 into a corresponding direct voltage. The direct voltage is then fed to a direct-voltage intermediate circuit 4. In the case of the depicted exemplary embodiments, the direct-voltage DC link 4 is, moreover, provided with an intermediate circuit capacitor 5, and with a brake resistor 6 which can be connected and disconnected via a brake chopper S7 of the direct-voltage DC link 4.

At least one inverter circuit 7 fed from the direct-voltage intermediate circuit 4 and having controllable semiconductor switches S1 through S6 is connected to the direct-voltage intermediate circuit 4.

In the case of the exemplary embodiment of FIG. 3 and FIG. 4, only a single inverter circuit 7 is connected to the direct-voltage DC link 4. This single inverter circuit 7 supplies the single servomotor M.

In the case of the exemplary embodiment of FIG. 5, several inverter circuits 7 are connected to the direct-voltage DC link 4. These several inverter circuits 7 respectively supply one of several servomotors M1 through M6 according to FIG. 4. For the sake of illustration, only two inverter circuits 7 and two servomotors M1 and M2 are shown in full in FIG. 5. The dashed arrows and the designations M3-M6 indicate a number of further servomotors M3, M4, M5, and M6, and further inverter circuits 7, all of which are connected to the common direct-voltage DC link 4.

In the case of the exemplary industrial robot 8 shown in FIG. 2, for example, a total of six inverter circuits 7 can be provided for the six servomotors M1 through M6 of the six joints L1 through L6 of the robot arm 9.

In the case of the illustrated exemplary embodiment, either the monitoring of the circuit, connected to the rectifier circuit 3a, of the direct-voltage DC link 4 for the flow of an electric current is implemented by a single current measurement in a first line 23 of the circuit which connects the rectifier circuit 3*a* to the direct-voltage DC link 4, or the monitoring of the circuit, connected to the rectifier circuit 3*a*, of the direct-voltage DC link 4 is implemented by a dual current measurement, both in the first line 23, connecting the rectifier circuit 3*a* to the direct-voltage DC link 4, of the circuit and in the second line 24, connecting the rectifier circuit 3 to the direct-voltage DC link 4, of the circuit.

The detection device 25 comprises a current sensor 26.1, wherein the detection device 25 is designed to implement a single current measurement in one of the two lines 23, 24, connecting the rectifier circuit 3*a* to the direct-voltage DC link 4, of the circuit.

However, the detection device 25 can have two current sensors 26.1, 26.2, wherein the detection device 25 is designed to redundantly and/or diversely implement a dual current measurement both in the first line 23, connecting the rectifier circuit 3*a* with the direct-voltage DC link 4, of the circuit and in the second line 24, connecting the rectifier circuit 3*a* to the direct-voltage DC link 4, of the circuit.

According to the embodiments of FIG. 3 and FIG. 5, the converter 1 is designed as a frequency converter 1*a*, the electrical grid 2 is an alternating-voltage grid 2*a*, and the input circuit 3 is designed as a rectifier circuit 3*a*.

In the first method step, a circuit, connected to the rectifier circuit 3*a*, of the direct-voltage DC link 4 is monitored for the flow of an electric current; if a stop signal occurs, the first switching device 21, 21*b* is switched off in order to end the supply of the direct-voltage DC link 4 from the electrical alternating-voltage grid 2*a*. A braking of the servomotor M, M1-M6 by controlling the power semiconductor switches S1-S6 of the inverter circuit 7 in a regenerative braking operation, or via a short-circuit braking, in order to reduce the rotation speed of the servomotor M, M1-M6, takes place in the event that the monitoring detects that an electric current is not flowing, after the first switching device 21, 21*b* has been switched off, in the circuit, connected with the rectifier circuit 3*a*, of the direct-voltage DC link 4. In contrast, a switching off the second switching device 22, 22*b* in order to prevent a feeding of electrical energy from the direct-voltage DC link 4 into the servomotor M, M1-M6 takes place in the event that, after the first switching device 21, 21*b* has been switched off, the monitoring detects a flow of electric current in the circuit, connected with the rectifier circuit 3*a*, of the direct-voltage DC link 4. The first switching device 21 is thereby formed by the thyristors 21*b* of the rectifier circuit 3*a*, and the second switching device 22*b* is formed by the power semiconductor switches S1-S6 of the inverter circuit 7. The thyristors 21*b* of the rectifier circuit 3*a* are, for example, controlled via a first signal output SA1 of the control device 27. Power semiconductor switches S1-S6 of the inverter circuit 7 are, for example, controlled via a second signal output SA2 of the control device 27.

In the exemplary embodiment according to FIG. 4, the first switching device 21 is formed by separate switches 21*a*, and the second switching device 22 is formed by the separate switches 22*a*. The first switching device 21 or the first switching devices 21 and 21*a*, as well as the second switching device 22 or the second switching devices 22 and 22*a*, and the detection device 25 or the current sensors 26.1 and/or 26.2, are connected to a control device 27, which implements the monitoring.

The control device 27 and/or the robot controller 10 are accordingly provided for controlling, according to the invention, at least one servomotor M, M1-M6 by means of the frequency converter 1, having the detection device 25 for detecting current and/or voltage profiles in the circuit, connected to the rectifier circuit 3*a* of the frequency converter 1, of the direct-voltage DC link 4 of the frequency converter 1*a*—in particular, via a second signal input SE2 from the current sensor 26.1 and/or current sensor 26.2—with: a first signal input SE1 for receiving a stop signal of a machine controller (for example, the robot controller 10) controlling the servomotor M, M1-M6; a first signal output SA1 for controlling a first switching device 21*a* of the frequency converter 1*a*, which is designed, in its switched-on state, to feed the direct-voltage DC link 4 with electrical energy from the rectifier circuit 3*a*, and, in its switched-off state, to electrically disconnect the direct-voltage DC link 4 from the rectifier circuit 3*a* so that no electrical energy goes from the rectifier circuit 3*a* to the direct-voltage DC link 4; and a second signal output SA2 for controlling a second switching device 22*a* of the frequency converter 1*a*, which is designed, in its switched-on state, to feed the servomotor M, M1-M6 with electrical energy from an inverter circuit 7 of the frequency converter 1*a*, and, in its switched-off state, to electrically disconnect the servomotor M, M1-M6 from the inverter circuit 7 so that no electrical energy goes from the inverter circuit 7 to the servomotor M, M1-M6; wherein the control device 27 is designed to implement the method.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. A method for controlling at least one servomotor using a converter, the method comprising:
   obtaining a converter, the converter comprising:
      an input circuit connected to an electrical grid,
      a direct-voltage DC link operatively coupled for receiving electrical energy from the input circuit,
      a first switching device which is designed, in its switched-on state, to feed the direct-voltage DC link with electrical energy from the input circuit and, in its switched-off state, to prevent a feed of the direct-voltage DC link from the electrical grid so that no electrical energy from the electrical grid reaches the direct-voltage DC link,
      at least one inverter circuit operatively coupled for receiving electrical energy from the direct-voltage DC link and has controllable power semiconductor switches for electrically controlling the at least one servomotor, and
      a second switching device which is designed, in its switched-on state, to feed the at least one servomotor with electrical energy from the inverter circuit in order to drive the at least one servomotor and, in its switched-off state, to prevent a driving of the at least one servomotor so that no electrical energy driving the at least one servomotor goes from the inverter circuit to the servomotor;
   monitoring a circuit of the direct-voltage DC link that is connected to the input circuit for the flow of an electric current;

switching off the first switching device in response to the occurrence of a stop signal, in order to end the supply of the direct-voltage DC link from the electrical grid;

braking the at least one servomotor by controlling the power semiconductor switches of the inverter circuit in a generative braking operation, or via a short-circuit braking, in order to reduce the rotation speed of the at least one servomotor, in response to detecting with the monitoring that an electric current is not flowing in the circuit that connects the input circuit to the direct-voltage DC link after the first switching device has been switched off; and switching off the second switching device in order to prevent a feeding of electrical energy from the direct-voltage DC link into the at least one servomotor in response to detecting with the monitoring a flow of electric current in the circuit that connects the input circuit to the direct-voltage DC link after the first switching device has been switched off.

2. The method of claim 1, wherein the converter is designed as a frequency converter, the electrical grid is an alternating-voltage grid, and the input circuit is designed as a rectifier circuit, the method further comprising:

monitoring a circuit of the direct-voltage DC link and that is connected to the rectifier circuit for the flow of an electric current;

switching off the first switching device in order to end the supply of the direct-voltage DC link from the alternating-voltage grid in response to the occurrence of a stop signal;

braking the at least one servomotor by controlling the power semiconductor switches of the inverter circuit in a generative braking operation, or via a short-circuit braking, in order to reduce the rotation speed of the at least one servomotor, in response to detecting with the monitoring that an electric current is not flowing in the circuit that connects the rectifier circuit to the direct-voltage DC link after the first switching device has been switched off; and switching off the second switching device in order to prevent a feeding of electrical energy from the direct-voltage DC link into the at least one servomotor in response to detecting with the monitoring a flow of an electric current in the circuit that connects the rectifier circuit to the direct-voltage DC link after the first switching device has been switched off.

3. The method of claim 2, wherein monitoring the circuit that connects the rectifier circuit to the direct-voltage DC link for a flow of an electric current comprises monitoring by a single current measurement in one of two lines that connect the rectifier circuit to the direct-voltage DC link.

4. The method of claim 2, wherein monitoring the circuit that connects the rectifier circuit to the direct-voltage DC link for a flow of an electric current comprises monitoring redundantly via a duplicate current measurement in both a first line connecting the rectifier circuit to the direct-voltage DC link and in a second line connecting the rectifier circuit to the direct-voltage DC link.

5. A method for controlling at least one servomotor using a converter, the method comprising:

obtaining a converter, the converter comprising:
an input circuit connected to an electrical grid,
a direct-voltage DC link operatively coupled for receiving electrical energy from the input circuit,
a first switching device which is designed, in its switched-on state, to feed the direct-voltage DC link with electrical energy from the input circuit and, in its switched-off state, to prevent a feed of the direct-voltage DC link from the electrical grid so that no electrical energy from the electrical grid reaches the direct-voltage DC link, at least one inverter circuit operatively coupled for receiving electrical energy from the direct-voltage DC link and has controllable power semiconductor switches for electrically controlling the at least one servomotor, and a second switching device which is designed, in its switched-on state, to feed the at least one servomotor with electrical energy from the inverter circuit in order to drive the at least one servomotor and, in its switched-off state, to prevent a driving of the at least one servomotor so that no electrical energy driving the at least one servomotor goes from the inverter circuit to the servomotor;

monitoring a circuit of the direct-voltage DC link that is connected to the input circuit for the flow of an electric current;

switching off the first switching device in response to the occurrence of a stop signal, in order to end the supply of the direct-voltage DC link from the electrical grid;

braking the at least one servomotor by controlling the power semiconductor switches of the inverter circuit in a generative braking operation, or via a short-circuit braking, in order to reduce the rotation speed of the at least one servomotor, in response to detecting with the monitoring that an electric current is not flowing in the circuit that connects the input circuit to the direct-voltage DC link after the first switching device has been switched off; and switching off the second switching device in order to prevent a feeding of electrical energy from the direct-voltage DC link into the at least one servomotor in response to detecting with the monitoring a flow of electric current in the circuit that connects the input circuit to the direct-voltage DC link after the first switching device has been switched off;

wherein the converter is designed as a frequency converter, the electrical grid is an alternating-voltage grid, and the input circuit is designed as a rectifier circuit, the method further comprising:

monitoring a circuit of the direct-voltage DC link and that is connected to the rectifier circuit for the flow of an electric current, switching off the first switching device in order to end the supply of the direct-voltage DC link from the alternating-voltage grid in response to the occurrence of a stop signal, braking the at least one servomotor by controlling the power semiconductor switches of the inverter circuit in a generative braking operation, or via a short-circuit braking, in order to reduce the rotation speed of the at least one servomotor, in response to detecting with the monitoring that an electric current is not flowing in the circuit that connects the rectifier circuit to the direct-voltage DC link after the first switching device has been switched off, and switching off the second switching device in order to prevent a feeding of electrical energy from the direct-voltage DC link into the at least one servomotor in response to detecting with the monitoring a flow of an electric current in the circuit that connects the rectifier circuit to the direct-voltage DC link after the first switching device has been switched off;

wherein monitoring the circuit that connects the rectifier circuit to the direct-voltage DC link for the flow of an electric current during running operation of the frequency converter comprises monitoring during operational control of the servomotor independently of the presence of a stop signal.

6. The method of claim 5, further comprising:
performing one of:
  a) directly comparing a magnitude of an amperage in a forward line in the direct-voltage DC link for uniformity with a magnitude of an amperage in a return line in the direct-voltage DC link, or
  b) comparing the current profiles detected by the monitoring of the circuit that connects the rectifier circuit to the direct-voltage DC link for the flow of an electric current with at least one of:
    control signals for the frequency converter, or
    at least one of current or voltage profiles between the inverter circuit and the servomotor; and
  deriving information about the functionality of an electrical component that performs the monitoring based on the comparison performed in steps a) or b).

7. A control device for controlling at least one servomotor using a frequency converter, the control device comprising:
  a detection device for detecting at least one of current or voltage profiles in a circuit of a direct-voltage DC link of the frequency converter that is connected to a rectifier circuit of the frequency converter;
  a first signal input configured for receiving a stop signal of a machine controller controlling the servomotor;
  a first signal output for controlling a first switching device of the frequency converter which is designed, in a switched-on state, to feed the direct-voltage DC link with electrical energy from the rectifier circuit, and, in a switched-off state, to electrically disconnect the direct-voltage DC link from the rectifier circuit so that no electrical energy goes from the rectifier circuit to the direct-voltage DC link; and
  a second signal output for controlling a second switching device of the frequency converter which is designed, in a switched-on state, to feed the servomotor with electrical energy from an inverter circuit of the frequency converter, and, in a switched-off state, to electrically disconnect the servomotor from the inverter circuit so that no electrical energy goes from the inverter circuit to the servomotor;
  wherein the control device is designed to implement a method according to claim 2.

8. The control device of claim 7, wherein:
  the detection device has at least one current sensor; and
  the detection device is designed to implement a single current measurement in one of two lines of the circuit that connects the rectifier circuit to the direct-voltage DC link.

9. The control device of claim 8, wherein:
  the detection device has two current sensors; and
  the detection device is designed to at least one of redundantly or diversely implement a dual current measurement in both a first line of the circuit connecting the rectifier circuit to the direct-voltage DC link, and in a second line of the circuit connecting the rectifier circuit to the DC link.

10. A robot, comprising:
  a robot arm comprising a plurality of links connected by joints and which are adjustable relative to one another by movement of the joints, and including at least one servomotor associated with at least one of the joints and which is designed to adjust the at least one joint by automatic control of the at least one servomotor; and
  a robot controller which is designed to automatically control the at least one servomotor in order to automatically adjust the links of the robot arm in relation to one another via driven movement of the joints;
  wherein the robot controller comprises a control device according to claim 7.

11. A computer program product for controlling at least one servomotor using a converter, wherein the converter comprises:
  an input circuit connected to an electrical grid,
  a direct-voltage DC link operatively coupled for receiving electrical energy from the input circuit,
  a first switching device which is designed, in its switched-on state, to feed the direct-voltage DC link with electrical energy from the input circuit and, in its switched-off state, to prevent a feed of the direct-voltage DC link from the electrical grid so that no electrical energy from the electrical grid reaches the direct-voltage DC link,
  at least one inverter circuit operatively coupled for receiving electrical energy from the direct-voltage DC link and has controllable power semiconductor switches for electrically controlling the at least one servomotor, and
  a second switching device which is designed, in its switched-on state, to feed the at least one servomotor with electrical energy from the inverter circuit in order to drive the at least one servomotor and, in its switched-off state, to prevent a driving of the at least one servomotor so that no electrical energy driving the at least one servomotor goes from the inverter circuit to the servomotor;
  the computer program product comprising program code stored in a non-transient, computer-readable storage medium, the program code, when executed by a computer, causing the computer to:
    monitor a circuit of the direct-voltage DC link that is connected to the input circuit for the flow of an electric current,
    switch off the first switching device in response to the occurrence of a stop signal, in order to end the supply of the direct-voltage DC link from the electrical grid,
    brake the at least one servomotor by controlling the power semiconductor switches of the inverter circuit in a generative braking operation, or via a short-circuit braking, in order to reduce the rotation speed of the at least one servomotor, in response to detecting with the monitoring that an electric current is not flowing in the circuit that connects the input circuit to the direct-voltage DC link after the first switching device has been switched off, and
    switch off the second switching device in order to prevent a feeding of electrical energy from the direct-voltage DC link into the at least one servomotor in response to detecting with the monitoring a flow of electric current in the circuit that connects the input circuit to the direct-voltage DC link after the first switching device has been switched off.

* * * * *